(12) United States Patent
Markle

(10) Patent No.: US 7,712,404 B1
(45) Date of Patent: May 11, 2010

(54) PIPE CHAMFERING TOOL

(76) Inventor: Mark W. Markle, 198 Pocohintas Dr., Inwood, WV (US) 25428

(*) Notice: Subject to any disclaimer, the term of this patent is extended or adjusted under 35 U.S.C. 154(b) by 757 days.

(21) Appl. No.: 11/135,549

(22) Filed: May 24, 2005

(51) Int. Cl.
 *B26F 1/08* (2006.01)
 *B23D 45/12* (2006.01)
 *B26D 11/00* (2006.01)
(52) U.S. Cl. .......................... 83/678; 407/39
(58) Field of Classification Search ......... 83/13, 83/678; 407/31, 37, 22, 39, 41, 45, 49, 38
 See application file for complete search history.

(56) References Cited

U.S. PATENT DOCUMENTS

| | | | |
|---|---|---|---|
| 2,748,631 A | | 6/1956 | Neale |
| 3,228,268 A | | 1/1966 | Strout |
| 3,515,029 A | * | 6/1970 | Gambini ................ 409/138 |
| 3,595,107 A | | 7/1971 | Dackow |
| 3,660,879 A | * | 5/1972 | Erkfritz ................... 407/41 |
| 3,662,445 A | * | 5/1972 | Whitaker ................. 407/71 |
| 4,047,670 A | * | 9/1977 | Svensson ................. 241/92 |
| 4,268,194 A | * | 5/1981 | Bloink et al. ............ 407/22 |
| 4,541,756 A | * | 9/1985 | Kubota .................... 407/45 |
| 4,608,755 A | * | 9/1986 | Braasch .................... 30/97 |
| 5,271,440 A | * | 12/1993 | Bradstreet et al. ....... 144/176 |
| 5,327,804 A | * | 7/1994 | Creaden ................... 83/305 |
| 5,439,039 A | * | 8/1995 | Bradstreet et al. ....... 144/220 |
| 5,983,967 A | * | 11/1999 | Gross et al. ............. 144/235 |
| 6,119,741 A | * | 9/2000 | Rowe et al. ............. 144/230 |
| 6,129,488 A | * | 10/2000 | Fahr ....................... 407/31 |

* cited by examiner

*Primary Examiner*—Ghassem Alie
(74) *Attorney, Agent, or Firm*—Patent & Trademark Services, Inc.; Joseph H. McGlynn

(57) ABSTRACT

A tool for chamfering the end of a pipe which is capable of accommodating a wide variety of different pipes, and employing at least one cutter assembly which can be positioned to cut either the outside or the inside edges of pipes, while simultaneously truing the end of the pipe.

3 Claims, 4 Drawing Sheets

PIPE CHAMFERING TOOL

BACKGROUND OF THE INVENTION

The present invention relates to a device and method for tapering or chamfering an end of a pipe. More specifically, it relates to a device having a plurality of cutters which slide in slots to adjust for different size pipes, thus enabling the device to accommodate a wide variety of pipes.

DESCRIPTION OF THE PRIOR ART

There are currently a variety of pipe cutting and chamfering tools being utilized. Such systems include those for tapering outside edges of pipes, those for tapering insides of pipes, and those for preparing ends of pipes for welding processes.

Important factors in the design of these chamfering tools are the size, shape and hardness of the pipes being cut. Chamfering tools currently available are typically designed for a specific and relatively limited functionality, e.g., designed exclusively for the outside or inside edge of a pipe, the end of a pipe, a plastic pipe, etc.

In the prior art various types of tools for chamfering and tapering pipes have been proposed.

For example, U.S. Pat. No. 6,129,488 to Fahr discloses a tool for cutting and chamfering thin wall pipes having a saw blade and a milling cutter mounted one behind the other on a shaft. The saw blade has a depression into which the milling cutter is inserted such that the outer edge of the milling cutter is protected.

U.S. Pat. No. 2,748,631 to Dackow discloses a tool for forming a taper on the end of plastic pipe comprising a circular cutter which rotates around the end of the pipe.

U.S. Pat. No. 3,595,107 to Neale discloses a tool for tapering the inside of a pipe having a cone shaped tool that is rotated inside the end of the pipe.

U.S. Pat. No. 3,228,268 to Strout discloses a portable tool for preparing the ends of stainless steel pipes for welding in end-to-end relationship.

While each of these tools accomplishes its intended purpose, they suffer from a number of drawbacks. For example, tools that are adjustable to a wide variety of differently-sized pipes are typically manually powered, slow to effect the result, and not useful for the hardest materials. On the other hand, tools that are powered may chamfer the pipe efficiently, but typically have a very limited type of pipes for which the machine can operate. This situation is wasteful and requires separate and distinct tools to accomplish similar tasks.

In order to overcome these problems, what is needed is a tool and method for cutting and chamfering a wide variety of pipes, which is customizable and useful for a wide variety of pipes and cutting requirements, while simultaneously being capable of fast efficient operation, thus addressing and solving problems associated with conventional tools and methods.

SUMMARY OF THE INVENTION

The present invention is directed to a device for tapering or chamfering the ends of pipes, and which has a plurality of cutters which slide in slots to adjust for different size pipes, thus enabling the device to accommodate a wide variety of pipes.

It is an object of the invention disclosed herein to provide a new and improved device for chamfering the edges of pipes.

It is an object of the invention disclosed herein to provide a new and improved device and method for tapering or chamfering the ends of pipes, the apparatus easily accommodating a wide variety of pipe sizes, by having a plurality of cutters which slide in slots to adjust for differently sized pipes.

It is an object of the invention disclosed herein to provide a device and method for tapering or chamfering the ends of pipes, capable of utilizing a plurality of cutters which can be employed to cut either the outside or the inside edges of pipes, while simultaneously truing the end of the pipe.

An advantage of this technique is that a single chamfering tool may be used to quickly and efficiently accomplish a variety of tasks, which previously would have required a plurality of separate and distinct tools.

These and other objects and advantages of the present invention will be fully apparent from the following description, when taken in connection with the annexed drawings.

BRIEF DESCRIPTION OF THE DRAWINGS

The teachings of the present invention can be readily understood by considering the following detailed description in conjunction with the accompanying drawings, in which.

DETAILED DESCRIPTION OF EXEMPLARY EMBODIMENTS

Figure 1:
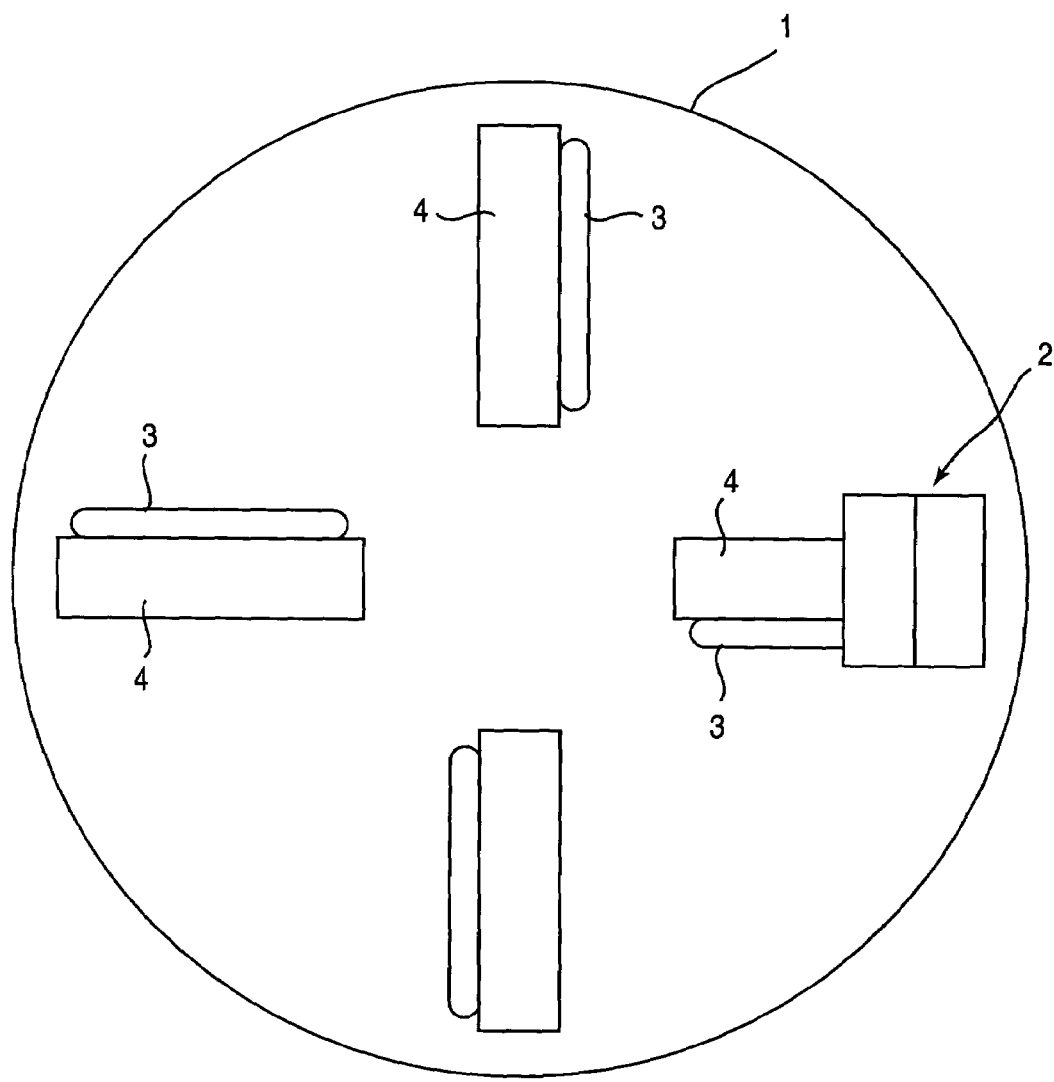
FIG. 1 depicts a top view of the present invention.
Figure 4:
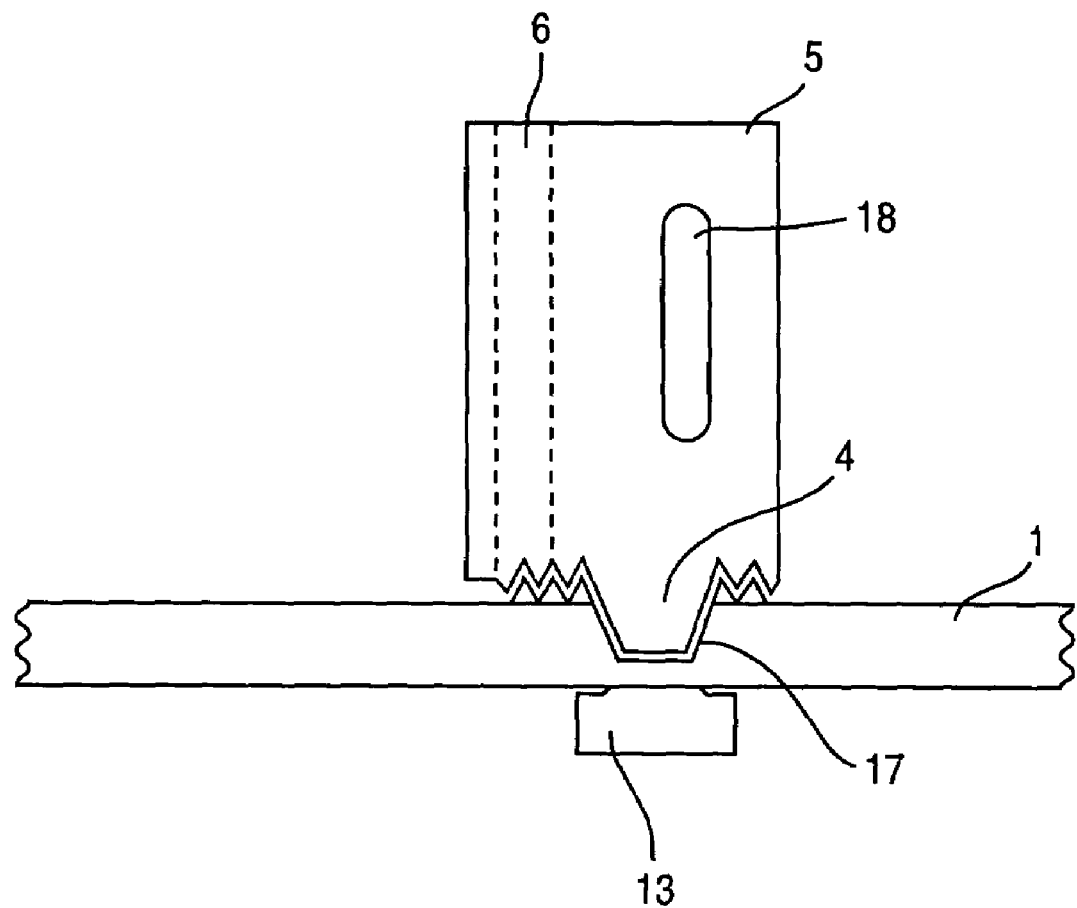
FIG. 4 depicts a back view of the present invention.

FIG. 1 depicts a top view of base plate 1. The base plate 1 is capable of accommodating at least one cutter assembly 2, but preferably there will be four or more cutters. The base plate contains adjustment slots 3 and key groove guides 4 for each cutter assembly 2. As shown in FIG. 4, the bottom of block 5 has a key guide 4 which cooperates with the key groove 17 on the top of plate 1, to guide the cutter assembly toward and away from the center of the plate 1. The guides allow the user to slide a cutter assembly 2 into the desired position on the base plate to adjust the cutter assemblies 2 to different size pipes. The adjustment slots 3 allow the cutter assembly to be locked into position on plate 1, as will be explained in more detail below.

Figure 3:
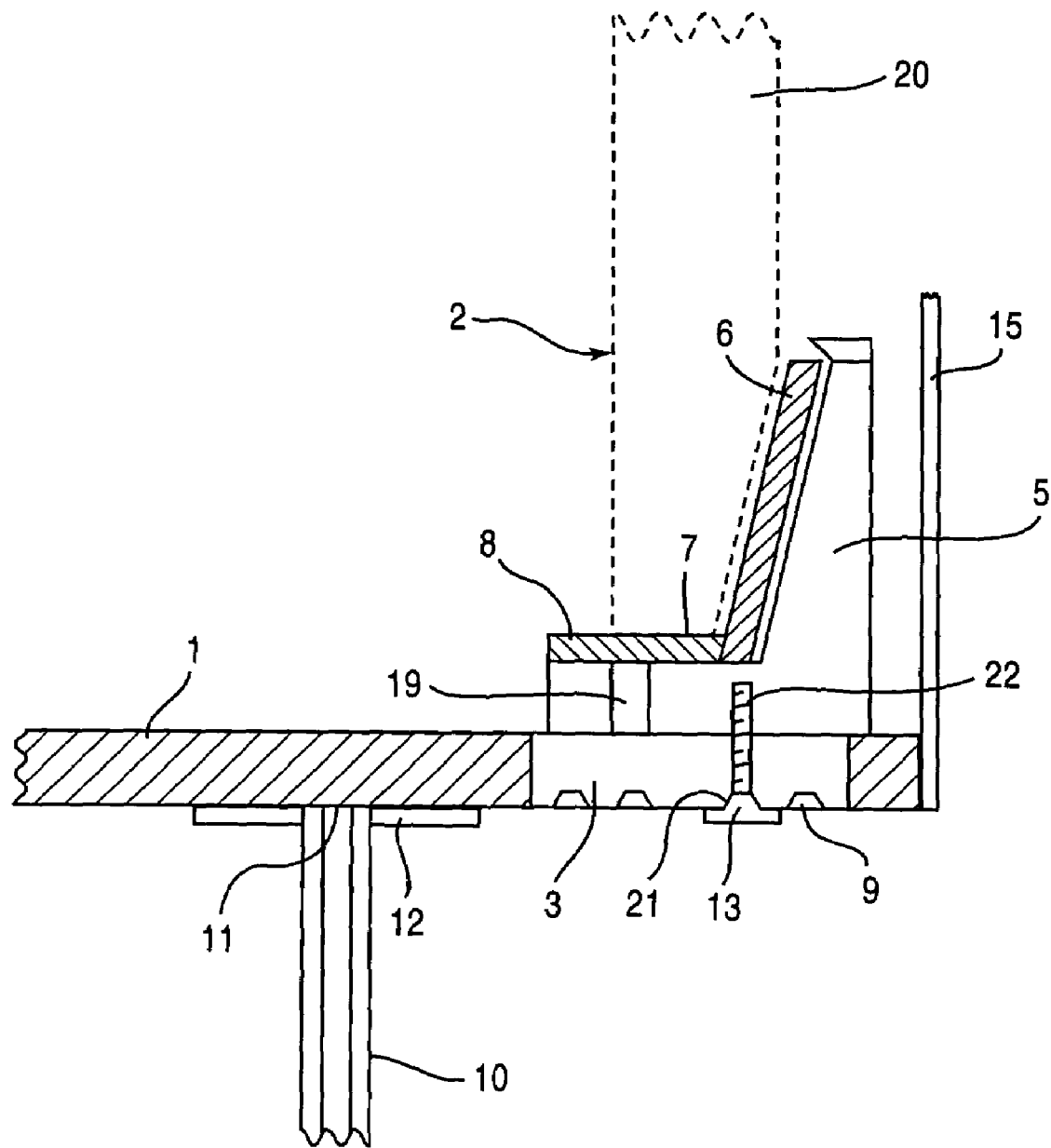
FIG. 3 depicts a side view of the present invention.

As shown in FIG. 3, cutter assembly 2 comprises a block 5 that has a cutter blade 6 secured thereto, in any conventional manner. Cutter blade 6 the present invention will taper the end of pipe 20 (shown in dotted lines). It should be noted that only a partial view of the wall of the pipe 20 is shown in FIG. 3 for clarity. A pipe rest 7 and another cutter blade 8 are secured to base plate 1 adjacent to cutter 6 in any conventional manner. Cutter blade 8 will true the end of the pipe 20. Note that the number and specific arrangement of cutter assemblies 2, corresponding to adjustment slots 3 and guides 4 are merely for illustrational purposes and different numbers and arrangements can be used without departing from the scope of the invention.

In operation, the base plate 1, as illustrated, is rotated in a clockwise direction, thus causing the cutter assembly 2 to chamfer the pipe (not shown in FIG. 1), with the vertical cutter blade 6 chamfering the pipe end and cutter blade 8 truing the end of the pipe in one operation.

It should be noted that FIG. 1, and all accompanying drawings, illustrate the cutting assemblies as they would be located on the outside of a pipe to be chamfered. However, the same tool may be used, by rotating each cutting assembly 2 by 180 degrees and sliding each cutting assembly 2 radially inward toward the center of base plate 1, to position each cutter assembly 2 on the inside of the pipe 20, thus contacting and cutting the inside surface of pipe 20 rather than the outside surface of pipe 20.

Figure 2:
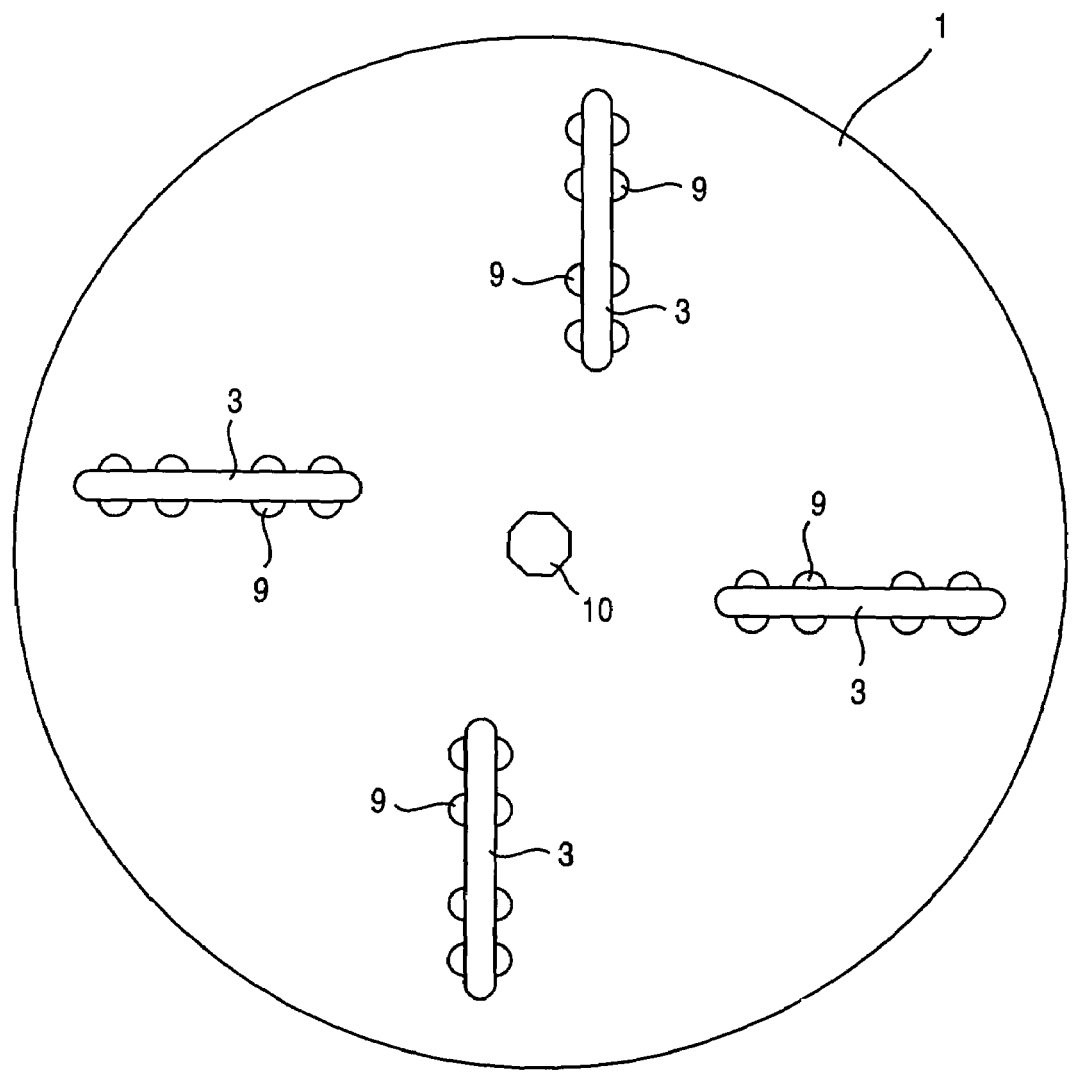
FIG. 2 depicts a bottom view of the present invention.

FIG. 2 depicts a bottom view of base plate 1. The recessed locations 9 accommodate lock knobs which lock the cutters 2 in position along the slots 3, as will be explained in more detail with respect to FIG. 3. At the center of the base plate 1 is a hexagonal shaft 10 which can be used to rotate the base plate 1. The shape of the hexagonal shaft 10 is merely for illustration purposes, and other shapes may be used without departing from the scope of the invention.

FIG. 3 depicts a partial side view of base plate 2. The hexagonal shaft 10 is attached to the center 11 of the base plate 1 by means of a steel adapter 12 or any other conventional securing means. It should be noted, however, that the hexagonal shaft 10 may also be formed unitary with the base plate 1 or it may be a separate piece and made integral with the base plate 1 by any conventional means. FIG. 3 also shows lock knobs 13 inserted into a recess 9 in adjustment slot 3. Also shown in FIG. 3 is a safety guard 15 which extends around base plate 1. The safety guard will help protect the operator from flying pieces from the cutting operation and help protect the operator from the cutters.

FIG. 4 depicts a back view of the cutter assembly 2. This view shows the slot or groove 17, on the top surface of plate 1, which cooperates with the guide 4 on block 5. Also shown is a slot 18 which is adjacent to cutter 6. Slot 18 allows cut portions of the pipe to escape to the outside of the cutter assembly so they will not clog up the cutters. Also, the bottom of the cutter assembly 2 and the top of plate 1 can have interengaging teeth 22 to lock these elements together to prevent slipping. It should be noted that these teeth can be used instead of lock knobs 13 or in addition to lock knobs 13.

The angle of the cut made by blade 6 is adjustable, by adjusting the angle at which the plane of the cutter blade 6 intersects the plane of the cutter blade 8. This may be done by any conventional means such as, but not limited to, shims which could be placed behind blade 6 to change the angle that blade 6 makes with blade 8. Locking knob 13 is used to adjust the position of cutter assembly 2 on the plate 1. As shown in FIG. 3 locking knob 13 has a tapered portion 21 which fits into recess 9. When portion 21 is in recess 9 the knob 13 will not be able to travel along the length of the slot 3 since the tapered portion 21 will not fit into the slot 3. In order to hold the portion 21 in one of the recesses 9, along slot 3, the knob has a threaded shaft 22 which is threaded into a threaded aperture in the bottom of block 5. Rotating the knob clockwise tightens the shaft 22 into the bottom of block 5 and, at the same time, moves the tapered portion 21 into recess 9, thereby locking block 5 in a specific location on plate 1.

Horizontal exhaust port 19 may be used to allow cuttings and shavings from the chamfering and truing process to pass outside the cutter assemblies so they will not interfere with the cutting process.

In order to use the present invention, the user places a pipe 20 in contact with the base plate 2 so the center of the pipe 20 is approximately aligned with the center of the base plate 2. The pipe 20 may be stabilized either manually or through the use of an external jig. The precise means of stabilizing the pipe is not a feature of this invention and as such is not shown in the drawings.

The user loosens lock knobs 13 and slides each of the cutter assemblies 2 along the guides 17 until the cutter assemblies 2 are in the desired position to contact pipe 20. Once in position, the assemblies are locked in place by means of knobs 13. The user then rotates base plate 1 so cutter assembly 2 contacts and cuts pipe 20. The user may accomplish this rotation manually. Alternatively, a power-actuated unit, such as an electrical motor or an internal combustion engine may be used to rotate base plate 1.

Cutter blade 8 will true up the end of the pipe and cutter blade 6 will chamfer either the outside or inside edge of pipe 20 as the plate is rotated with respect to the pipe. If multiple cutter assemblies 2 are used, then a user would typically align the cutter assemblies 2 all at the same radius from the center of the base plate 1.

Although the Pipe Cutting Tool and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What is claimed is:

1. A device for chamfering a pipe, comprising:
a base plate,
said base plate having a top and a bottom,
means for rotating said base plate,
a cutter assembly,
said cutter assembly comprising:
a support block,
said support block having means for engaging and tapering a surface of said pipe, and
said support block having means for engaging and cutting off an end of said pipe, and
wherein said base plate has means for guiding said cutter assembly along said top surface of said base plate, and
wherein said means for guiding said cutter assembly comprises a guide secured to said top surface of said face plate,
said guide having a specific shape,
said support block having a projection in a bottom surface, and said projection has a complimentary shape to said guide.

2. The device as claimed in claim 1, wherein said guide has angled sides.

3. A device for chamfering a pipe, comprising:
a base plate,
said base plate having a top and a bottom,
means for rotating said base plate,
a cutter assembly,
said cutter assembly comprising:
a support block,
said support block having means for engaging and tapering a surface of said pipe, and
said support block having means for engaging and cutting off an end of said pipe, and
wherein said support block has means for adjustably securing said support block to said base plate to allow said support block to move toward and away from a center of said base plate, and
wherein said means for adjustably securing said support block to said base plate comprises a slot in said base plate, and
said support block has a threaded aperture in a bottom surface of said support block, and
a knob which has a threaded shaft,
said threaded shaft extending through said slot and engages said threaded aperture, and
wherein said slot has a plurality of enlarged portions spaced there along, and
said knob has an enlarged portion which will fit into one of said enlarged portions in said slot.

* * * * *